forming a substantially horizontal fracture extending from the borehole of the well into the oil zone of the formation, injecting a fluid sealing material capable of forming a solid material insoluble in oil and in water into the fracture and into the walls of the fracture, injecting a liquid containing a propping agent into the fracture to carry the propping agent into the fracture and displace the sealing material from the fracture into the formation adjacent the walls of the fracture, shutting the well in for a period to allow setting of the sealing material to form a substantially permanent and continuous barrier to flow through said walls into the fracture, extending the fracture radially beyond the sealed walls thereof, and depositing a propping agent in said extension whereby on production of the oil fluids enter the extension of the fracture and flow through the fracture to the well.

4. A process as set forth in claim 3 in which the sealing material is a liquid capable of setting to form a synthetic resin insoluble in oil and in water 5. In a method of producing oil from a pay zone containing a gas zone above an oil zone and a water zone below the oil zone, the improvement comprising forming a substantially horizontal fracture extending from the borehole of a well into the oil zone, displacing into the fracture a fluid sealing composition capable of forming a solid material insoluble in oil and in water, displacing a wash liquid having a propping agent suspended therein into the fracture to prop the fracture open and flush the sealing composition therefrom, maintaining pressure on the well to prevent flow from the formation into the fracture while the sealing composition sets to seal the walls of the fracture, extending the fracture radially beyond the sealed walls of the fracture, and depositing a propping agent in the extension of the fracture whereby fluids enter said extension and flow through the fracture for production from the well.

6. A method of treating a well to reduce coning into the well of fluids other than oil during the production of oil from an oil-bearing formation penetrated by the borehole of the well, said oil-bearing formation having an oil zone and a zone of a fluid other than oil adjacent to and communicating with said oil zone, comprising forming a substantially horizontal fracture from the borehole into the oil zone of the formation, injecting a propping agent into the fracture, propping the fracture open, injecting an aqueous solution of aluminum salt into the fracture and from the fracture into the formation, injecting gaseous ammonia into the fracture whereby said ammonia enters the formation and reacts with the aluminum salt to form a precipitate plugging the formation adjacent the walls of the fracture to form a substantially permanent and continuous barrier to flow of fluids through said walls into the fracture, extending the fracture beyond the plugged walls of said fracture and depositing a propping agent in said extension of the fracture.

7. A method of treating a well to reduce coning into the well of fluids other than oil during production of oil from an oil-bearing formation penetrated by the borehole of the well, said oil-bearing formation having an oil zone and a zone of a fluid other than oil adjacent to and communicating with said oil zone, comprising forming a substantially horizontal fracture from the borehole into the oil zone of the formation, depositing a propping agent in the fracture to prop the fracture open, injecting an aqueous fluid into the fracture and into the walls of the fracture, displacing the aqueous fluid from the fracture, injecting silicon tetrafluoride into the walls of the fracture whereby the silicon tetrafluoride is hydrolyzed to plug the walls of the fracture and thereby form a substantially permanent and continuous barrier to flow of fluids through said walls into the fracture, extending the fracture radially beyond the plugged walls thereof, and depositing a propping agent in the fracture and the extension of the fracture.

8. A method of treating an oil well penetrating an oil-bearing formation having an oil zone and a zone of a fluid other than oil adjacent to and communicating with said oil zone to reduce coning of fluids other than oil into the well comprising forming a substantially horizontal fracture extending from the well into the oil zone by injecting a fracturing fluid containing a sealing composition capable of forming a solid material insoluble in oil and in water down the well and into the oil zone under a pressure adequate to fracture the formation, following the fracturing fluid containing the sealing composition with a fracturing fluid free of sealing composition to displace sealing composition from the fracture into the formation adjacent the walls of the fracture and to form an extension of the fracture, injecting a propping agent into the fracture, and shutting in the well to allow the sealing composition to set and form a substantially permanent and continuous barrier to flow of fluid through the formation adjacent the fracture radially inward from the extension.

9. A method of treating an oil well penetrating an oil-bearing formation to reduce coning of fluids other than oil into the well during production from the well, said oil-bearing formation having an oil zone and a zone of a fluid other than oil adjacent to and communicating with said oil zone, comprising forming a substantially horizontal fracture extending from the well into the oil zone, substantially permanently plugging the formation adjacent the walls of the fracture with a material insoluble in oil and in water to prevent flow of oil and of water from the formation through the plugged formation into the fracture, and thereafter extending the fracture radially beyond the plugged walls of the fracture to form an extension of the fracture, depositing a propping agent in the fracture and extension thereof, and reducing the pressure on the well, whereby oil flows into said extension and through the fracture for production from the well.

References Cited in the file of this patent

UNITED STATES PATENTS

| | | |
|---|---|---|
| 2,699,212 | Dismukes | Jan. 11, 1955 |
| 2,805,721 | Maly | Sept. 10, 1957 |
| 2,827,121 | Nowak | Mar. 18, 1958 |
| 2,896,717 | Howard | July 28, 1959 |
| 2,959,223 | Harmon et al. | Nov. 8, 1960 |
| 3,004,498 | Ramos | Oct. 17, 1961 |

United States Patent Office 3,172,472
Patented Mar. 9, 1965

3,172,472
IGNITION OF FUELS BELOW THE SURFACE
OF THE GROUND
Francis M. Smith, Butler, Pa., assignor to Gulf Research &
Development Company, Pittsburgh, Pa., a corporation
of Delaware
Filed Sept. 22, 1960, Ser. No. 57,790
5 Claims. (Cl. 166—38)

This invention relates to methods of releasing heat in underground formations and is more particularly directed to the ignition of fuels below the surface of the ground.

Frequently, it is desirable to heat underground oil-bearing formations or the borehole of oil wells to increase the production of oil from wells. Sometimes it is only desired to heat the borehole of a well to a temperature at which waxes plugging the formation or tubing in the well are melted and can be removed from the well. At other times the heat is liberated in the borehole of a well for the stabilization of formations surrounding the borehole. For example, it is sometimes desirable to heat the formations surrounding the borehole of a well to temperatures at which clays in the formation are irreversibly dehydrated. Then, if water contacts the clays during production of fluids through the well, the clays do not become hydrated and thereby reduce the permeability of the formation.

A process in which very large quantities of heat are released underground to increase production from oil-bearing formations is the in situ combustion process in which carbonaceous materials present in the underground formation are burned in place in the formation at some distance from the borehole. Heat released by the combustion increases the temperature in the underground formations to reduce the viscosity of oils by raising their temperature as well as by cracking them to less viscous products. The resulting low viscosity oils may then be displaced more easily through the formation to a well through which they are lifted to the surface.

Several procedures have been tried with varying degrees of success for the ignition of fuels in the borehole of a well. One procedure which is frequently suggested is to suspend an electric igniter in the region at which combustion is desired. That method is inconvenient in that it is necessary to run electric lines down into the well to carry the current to the igniter. Moreover, if the igniter works by means of a spark across a gap, it is often difficult to obtain a spark capable of igniting a fuel-air mixture at the low temperature and high pressure that sometimes exist in the borehole of a well.

Another method that has been suggested is to drop particles of phosphorus down the tubing to the bottom of the well and then displace air down the well into contact with the phosphorus. Upon contact with the air the phosphorus ignites and releases heat which will ignite a fuel-air mixture displaced down the well. Dropping solid phosphorus particles down tubing, which may be several thousand feet long, frequently results in the solid particles being more or less completely eroded into fine particles. If there is any air present in the tubing the particles may ignite before reaching the bottom of the well and the heat then is not released at the location desired. If water is present at the bottom of the well phosphorus sinks in the water and is protected from the air. Moreover, the temperature required for the ignition of phosphorus on contact with air is relatively high under under optimum conditions. Often, particularly in shallow wells, the phosphorus will not ignite when in contact with air because of the low temperature in the borehole.

It has been suggested that a solution of phosphorus in a volatile solvent be displaced down the well and into the formation. After the solvent is displaced into the formation, air is delivered down through the well and forced into the formation. This technique, although sometimes suitable for ignition of oils in the formation surrounding the borehole because heat released upon ignition of the phosphorus is retained by the formation, often is not effective for ignition of fuels in the borehole of a well, partially because evaporation of the solvent cools the borehole. If the phosphorus is ignited, the relatively small amount of heat released by combustion of the phosphorus is rapidly carried from the borehole by the combustion products and a temperature high enough to ignite a subsequently injected fuel may not be reached.

This invention resides in a method for the ignition of a fuel underground by displacing triethylborane down the borehole of a well out of contact with an oxygen-containing gas. The triethylborane is brought into contact with the oxygen-containing gas at the location where ignition is desired, whereupon the triethylborane is ignited. The heat released by combustion of the triethylborane ignites the fuel which is displaced down the well after the triethylborane.

In the drawing:

FIGURE 1 is a schematic illustration, partially in vertical section, of a well equipped for performance of the process of this invention.

Referring to the drawing, a well indicated generally by reference numeral 10 is, illustrated extending to a total depth 12 in an oil-bearing formation 14. Well 10 is illustrated with casing 16 extending downwardly from above the surface 17 of the ground into the upper portion of the formation 14 and cemented in place in accordance with the conventional practice. Although this invention is illustrated and described for a well with an open hole through the formation 14, it is not so limited, and also can be used in a well in which a casing extends part or all of the way through the formation 14.

The upper end of casing 16 is closed with a suitable closure 18. A side inlet 20 is provided in casing 16 above the surface of the ground for connection to a cooling air supply line 22. A valve 24 in the cooling air supply line allows control of the rate of introduction of cooling air into the casing 16.

Extending downwardly within the casing 16, usually substantially to the bottom of the borehole of well 10, is an air supply tubing 26. The lower end of air supply tubing 26 adjacent the oil-bearing formation 14 is perforated as indicated at 28 for the discharge of air and combustion products from the lower end of the air supply tubing 26. The air supply tubing 26 may be suitably protected at its lower end by a coating of ceramic material to aid the tubing in withstanding the high temperatures resulting from the combustion that occurs in that area.

Air supply tubing 26 extends upwardly through closure 18 and is provided with a suitable closure 30 at its upper end. A side inlet 32 near the upper end of tubing 26 is connected to an air supply line 34 for the introduction of air for the initiation of combustion in the lower portion of the air supply tubing 26. A valve 35 is provided in the air supply line 34 for control of the rate of injection of the air through the air supply tubing.

A fuel line 36 extends down the tubing 26 to a level just above the perforations 28 in the air supply tubing. A flame anchor consisting of a lower disk 38 supported by a spider 40 is suspended from the lower end of fuel line 36. Mounted in the lower end of the fuel line 36 is a back pressure valve 42 which may be of conventional construction and is illustrated in the drawing as a spring fuel line under a pressure adapted to open the back-pressure valve whereby the triethylborane is displaced down the fuel line and discharged from the lower end of the fuel line and ignited by admixture with air delivered through the conduit, and continuing the displacement of air and combustible fuel downwardly into the borehole of the well.

2. A method as set forth in claim 1 in which the triethylborane is dissolved in a liquid hydrocarbon.

3. A method as set forth in claim 1 in which the inert liquid is water.

4. A method as set forth in claim 1 in which the inert liquid comprises hydrocarbons.

5. In the production of oil from an oil-bearing underground formation penetrated by the borehole of a well in which a fluid hydrocarbon fuel is burned underground to raise the temperature of the formation and thereby increase the production of oil, said well having tubing extending downwardly therein with its lower end substantially at the level of the desired underground burning, a process for igniting said fuel comprising temporarily closing the lower end of said tubing, filling said tubing with an inert liquid, injecting triethylborane into the upper end of said tubing under pressure to open the lower end of the tubing and displace said inert liquid from the lower end of the tubing, following the triethylborane down the tubing with said fuel under a pressure adequate to displace said triethylborane and fuel from the tubing, and passing an oxygen-containing gas downwardly through the borehole of the well through a passage other than the tubing to mix with triethylborane discharged from the lower end of the tubing thereby igniting said triethylborane to liberate heat and ignite said fuel.

References Cited in the file of this patent
UNITED STATES PATENTS

| | | |
|---|---|---|
| 2,747,672 | Simm | May 29, 1956 |
| 2,847,071 | De Priester | Aug. 12, 1958 |
| 2,863,510 | Tadema et al. | Dec. 9, 1958 |
| 2,941,596 | Kaasa | June 21, 1960 |
| 3,057,763 | Hunt et al. | Oct. 9, 1962 |

OTHER REFERENCES

"Jet Propulsion Boosts Interest in Flame Mechanics," Chemical and Engineering News, Sept. 27, 1948, pp. 2892–2893.

The Callery Chemical Co., "Callery Compounds To Lead You to New or Improved Products," Chemical and Engineering News 33, 18, May 4, 1959, pages 56–58.